(12) United States Patent
Dong et al.

(10) Patent No.: US 11,018,502 B2
(45) Date of Patent: May 25, 2021

(54) CABLE WITH OVER-TEMPERATURE PROTECTION

(71) Applicant: Polytronics Technology Corp., Hsinchu (TW)

(72) Inventors: Zhen Yu Dong, Tainan (TW); Yung Hsien Chang, Douliu (TW); Hsiu Che Yen, Taoyuan (TW); Yao Te Chang, Linnei Township, Yunlin County (TW); Pin Syuan Li, Hsinchu (TW)

(73) Assignee: Polytronics Technology Corp., Hsinchu (TW)

( * ) Notice: Subject to any disclaimer, the term of this patent is extended or adjusted under 35 U.S.C. 154(b) by 100 days.

(21) Appl. No.: 16/290,279

(22) Filed: Mar. 1, 2019

(65) Prior Publication Data
US 2020/0119547 A1    Apr. 16, 2020

(30) Foreign Application Priority Data
Oct. 11, 2018    (TW) .................................. 107135715

(51) Int. Cl.
| | | |
|---|---|---|
| *H01C 7/02* | (2006.01) | |
| *H02H 9/02* | (2006.01) | |
| *H01R 107/00* | (2006.01) | |
| *H01R 24/60* | (2011.01) | |
| *H01H 1/04* | (2006.01) | |
| *H01C 7/10* | (2006.01) | |
| *H02H 5/04* | (2006.01) | |

(52) U.S. Cl.
CPC .............. *H02H 9/026* (2013.01); *H01C 7/02* (2013.01); *H01C 7/10* (2013.01); *H01H 1/04* (2013.01); *H01R 24/60* (2013.01); *H01R 2107/00* (2013.01); *H02H 5/04* (2013.01); *H02H 9/02* (2013.01)

(58) Field of Classification Search
USPC ......................................................... 361/106
See application file for complete search history.

(56) References Cited

U.S. PATENT DOCUMENTS

| | | | |
|---|---|---|---|
| 9,960,545 B2 | 5/2018 | Golubovic et al. | |
| 2008/0009578 A1* | 1/2008 | Khatua ..................... | C08K 3/22 |
| | | | 524/431 |
| 2018/0097318 A1* | 4/2018 | Golubovic ............. | H02H 5/042 |
| 2019/0237224 A1* | 8/2019 | Heinemann ............ | H01C 7/028 |

FOREIGN PATENT DOCUMENTS

| | | |
|---|---|---|
| TW | 201604901 A | 2/2016 |
| TW | 201814970 A | 4/2018 |

* cited by examiner

*Primary Examiner* — Danny Nguyen
(74) *Attorney, Agent, or Firm* — Muncy, Geissler, Olds & Lowe, P.C.

(57) ABSTRACT

A cable comprises a power conductor, a data conductor and a first PTC device. The power conductor is configured to transmit electrical power between a source and a sink. The data conductor is configured to transmit data between the source and the sink. The first PTC device is coupled to the data conductor and its resistance increases drastically to decrease current flowing through the data conductor if a temperature of the first PTC device exceeds a first trip temperature. The first trip temperature is 55-80° C. The resistance of the PTC device is larger than 20 kΩ at 85° C. and larger than 80 kΩ at 100° C. A current flowing through the data conductor does not exceed 20 mA.

12 Claims, 3 Drawing Sheets

CABLE WITH OVER-TEMPERATURE PROTECTION

BACKGROUND OF THE INVENTION (1) Field of the Invention

The present application relates to a cable, and more specifically, to a data and/or power transmission cable with over-temperature protection.

(2) Description of the Related Art

With the development of mobile apparatuses, users require more functions. As such, electricity volume of a battery of a mobile apparatus becomes larger to meet the need of a larger screen size of the mobile apparatus, and high efficient quick charge technology is prevalent gradually. Therefore, high power battery charging is demanded. During high power charging, connectors, e.g., USB, microUSB, or USB Type-C, serving as input/output interfaces for charging may be blown due to micro short-circuit. According to USB Type-C standard, USB cables can transmit powers up to 100 watts to provide high power applications which are not achievable before.

However, it was observed that high power transmission may induce thermal damage to a USB cable if the pins of the USB cable is dirty, bent or micro short-circuits occurs. For example, in charging with a large current, with the increase of hot-plugging times, unexpected bodies such as hairs, metal scraps, liquids or coffee dregs may enter the connectors to incur micro short-circuit. Micro short-circuit may also occur if connectors are damaged or deformed due to plugging on a slant or violent plugging. Micro short-circuit does not meet the criteria to trigger short-circuit protection, and thus a battery charger continuously outputs power which transforms into heat to heat up the connector and the battery charger. As a consequence, the connector or the battery charger may have a malfunction or be burned out. These problems incur safety concerns during battery charging, and therefore it is highly demanded to effectively resolve these problems.

It was known to install a positive temperature coefficient (PTC) device in series with a power conductor, e.g., a Vbus conductor, of the USB cable to resolve the problems. The resistance of the PTC device gradually increases as temperature rises and increases drastically, i.e., trip, when the temperature exceeds a threshold value or over-current occurs to suppress the amount of current in the Vbus conductor to avoid damage to the USB cable. This provides practical solutions to over-current and over-temperature protections in the present USB cables of low powers such as 5 or 20 watts. However, a PTC device with a small size and high-power endurance with a view to satisfying the requirements of USB cables of high powers such as 100 watts is not easily obtained.

U.S. Pat. No. 9,960,545 devised a PTC device coupled to a non-power conductor, e.g., configuration channel (CC) conductor, rather than Vbus. In USB cable operation, if temperature exceeds the trip temperature of the PTC device, the PTC device becomes to be of a high resistance. As a result, the CC conductor coupled to a source and a sink at the two ends of the cable is electrically "open" so that the data and/or power transmission of the cable between the source and the sink are ceased. Because the PTC device is not coupled to the power conductor Vbus, it need not to withstand a high power and a large amount of current. Therefore, the PTC device would easily meet the requirement of specification and can be made in a small size. Nevertheless, the PTC device still has to meet resistance-temperature (R-T) requirement for cable applications and needs to be improved in terms of many technical characteristics.

SUMMARY OF THE INVENTION

To resolve the problems that protection is not activated when micro short-circuit occurs during battery charging or data transmission, the present invention devises a data and/or power transmission cable in which a PTC device of a low trip temperature and a high resistance jump is in series with a non-power conductor to provide over-temperature protection.

In accordance with an embodiment of the present application, a cable comprises a power conductor, a data conductor and a first PTC device. The power conductor is configured to transmit electrical power between a source and a sink. The data conductor is configured to transmit data between the source and the sink. The first PTC device is coupled to the data conductor, and its resistance increases drastically to decrease current flowing through the data conductor if a temperature of the first PTC device exceeds a first trip temperature. The first trip temperature is 55-80° C. The resistance of the first PTC device is larger than 20 kΩ at 85° C., and larger than 80 kΩ at 100° C. A current flowing through the data conductor does not exceed 20 mA.

In an embodiment, when the cable connects to the source and the sink, the first PTC device is in series connection between the source and the sink.

In an embodiment, the data conductor comprises a CC conductor, a D+ data conductor or a D− data conductor.

In an embodiment, the cable further comprises a Vconn conductor and a second PTC device. The second PTC device is coupled to the Vconn conductor and its resistance increases drastically to decrease current flowing through the Vconn conductor if a temperature of the second PTC device exceeds a second trip temperature.

In an embodiment, when the cable connects to the source and the sink, the second PTC device is in series connection between the source and the sink.

In an embodiment, the cable is in compliance with a USB Type C standard.

In an embodiment, the first PTC device has a PTC material comprising a polymer and a conductive filler dispersed in the polymer.

In an embodiment, the first PTC device has a resistivity less than 3 Ω·cm.

In an embodiment, the polymer comprises low density polyethylene of which a melting temperature range is 50-100° C.

In an embodiment, the low density polyethylene comprises 35-70% by volume of the PTC material.

In an embodiment, the conductive filler comprises carbon black, titanium carbide, tungsten carbide or mixture thereof.

In an embodiment, the conductive filler comprises carbon black and titanium carbide. The carbon black comprises 5-10% by volume of the PTC material, and the titanium carbide comprises 40-50% by volume of the PTC material.

In an embodiment, the polymer comprises low density polyethylene of 55-75% by volume of the PTC material, and the conductive filler comprises carbon black of 25-45% by volume of the PTC material.

In the present application, the PTC device with a low trip temperature is coupled to the data conductor of the cable for temperature sensing. When a temperature of the PTC device exceeds the trip temperature, the PTC device becomes to be of a high resistance to cause the cable to cease power and/or data transmission. This technology is suitable for high power cable applications such as those in compliance with USB Type C standard.

BRIEF DESCRIPTION OF THE DRAWINGS

The present application will be described according to the appended drawings in which.

DETAILED DESCRIPTION OF THE INVENTION

The making and using of the presently preferred illustrative embodiments are discussed in detail below. It should be appreciated, however, that the present application provides many applicable inventive concepts that can be embodied in a wide variety of specific contexts. The specific illustrative embodiments discussed are merely illustrative of specific ways to make and use the invention, and do not limit the scope of the invention.

Figure 1:
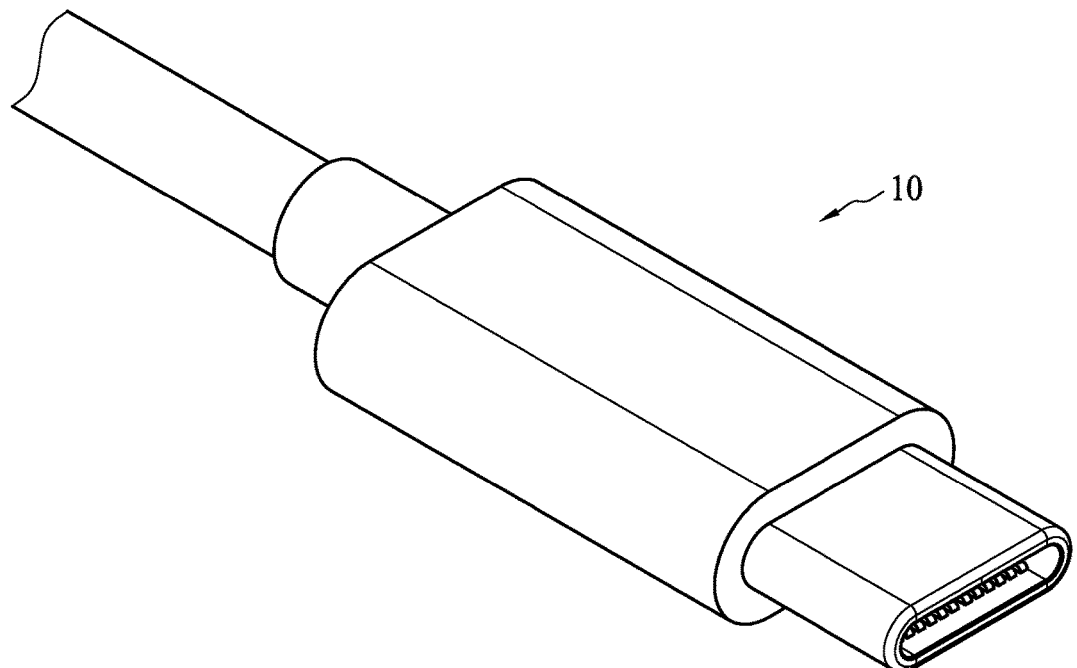
FIG. 1 shows a cable in accordance with an embodiment of the present application.
Figure 2:
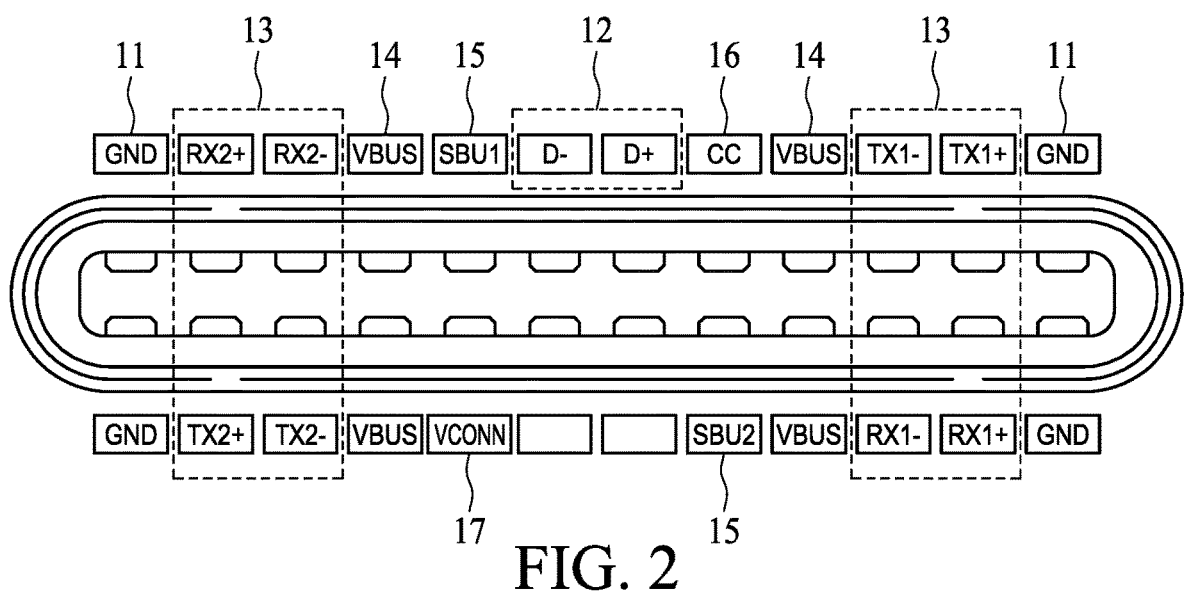
FIG. 2 shows a pin or conductor layout of the cable in accordance with an embodiment of the present application.

FIG. 1 shows a cable 10, e.g., a USB Type C data/power transmission cable, in accordance with an embodiment of the present application. FIG. 2 shows a conductor or pin layout of the cable 10. The cable 10 comprises ground conductors 11, high speed (USB 2.0) data conductors 12, super speed+(USB 3.1) data conductors 13, electrical power conductors (Vbus) 14, sideband use conductors 15, a CC conductor 16 and a Vconn conductor 17, in which particular relevance to the present application are electrical power conductors 14, the CC conductor 16, the Vconn conductor 17 and high speed data conductors 12. For clear illustration to the present application, the other conductors are omitted in the other figures.

The CC conductor 16 detects whether the cable 10 is connected to determine the current mode of Vbus conductors 14 and generates correct signals according to plug orientation. An integrated circuit (IC) of the cable 10 detects a voltage drop of the CC conductor 16, and a resistance of the CC conductor 16 can be determined upon the voltage drop. If the resistance of the CC conductor 16 is detected and is in a low value range "A", the power conductors 14 output voltage and current in "A" mode. If the resistance is in a high value range "B", the power conductors 14 output voltage and current in "B" mode. If the resistance is infinite, indicating the cable is not connected to devices, there is no voltage and current output in the power conductors 14. USB Type C supports reversible plug orientation, the CC conductor 16 detects plug orientation and accordingly generates signals to selectively connect correct pins or conductors of the data conductors 13.

Figure 3:
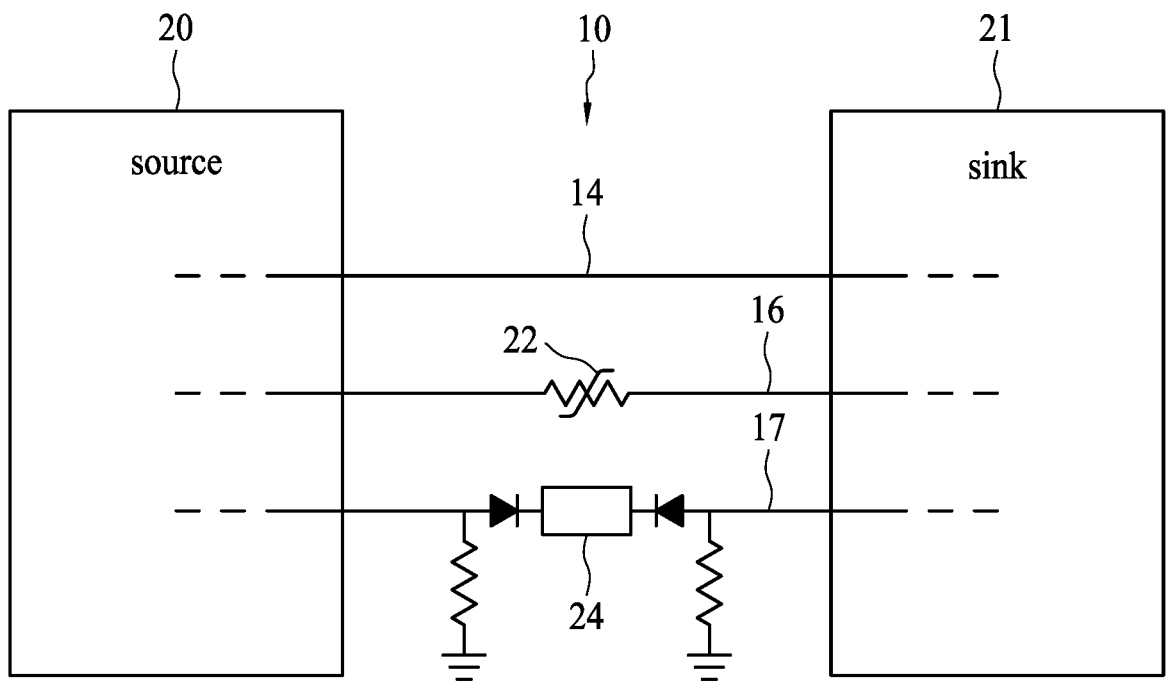
FIG. 3 shows a schematic diagram illustrating portions of a cable connected to a source and a sink in accordance with an embodiment of the present application.

In FIG. 3, the cable 10 is connected between a source 20 and a sink 21. For example, the source 20 may be a battery charger, and the sink 21 may be a portable device such as a mobile phone or a laptop computer. For clear illustration, only the power conductor 14, the CC conductor 16 and the Vconn conductor 17 of the cable 10 relevant to this embodiment are depicted in FIG. 3, and other conductors are omitted. A PTC device 22 is associated with the CC conductor 16 and is in series with the source 20 and the sink 21. The Vconn conductor 17 is equipped with an IC 24 that determines output power upon the devices to which the cable 10 connected. During operation of the cable 10, if the temperature of the PTC device 22 rises and exceeds its trip temperature, this may result from exposure to a high temperature environment, the PTC device 22 would exhibit high electrical resistance and diminish current flowing through the CC conductor 16. Thus, the CC conductor 16 appears "open", i.e., disconnected, to the source 20 and to the sink 21, and accordingly the source 20 and the sink 21 stop transmitting data and/or power via the cable 10. In the environments of cable applications, 70° C. or 80° C. is a very high temperature. It is demanded that the PTC device 22 has a trip temperature of 55-80° C. so as to timely and effectively provide over-temperature protection. Instead, the PTC device 22 may be implemented on the CC conductor 16 in the source 20 and/or the sink 21, or a plurality of PTC devices 22 are implemented on the CC conductor 16, thereby one or more PTC devices are in series connection to the CC conductor 16 to suppress current. The PTC device 22 is coupled to the CC conductor 16 rather than the power conductor 14, the PTC device 22 only needs to hold nominal current, e.g., 330 µA, without trip regardless of the amount of current flowing through the power conductor 14, e.g., 5 A. In an embodiment, the current on the CC conductor 16 does not exceed 20 mA to provide more flexibility to the selection of the PTC device 22.

Figure 4:
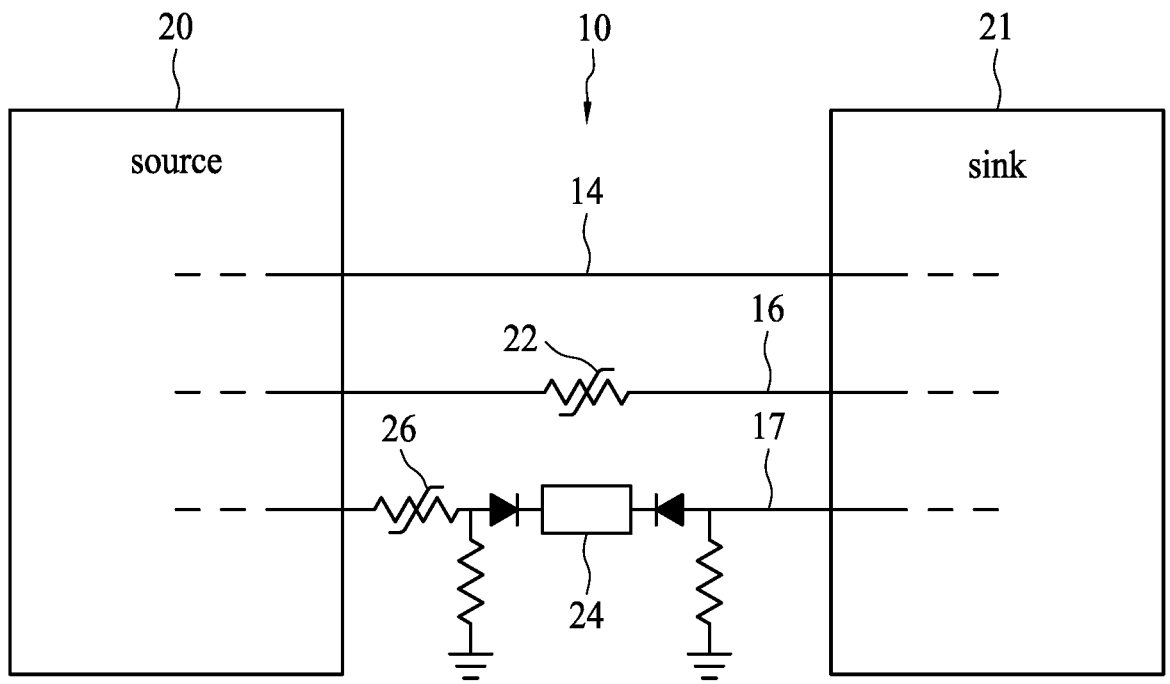
FIG. 4 shows a schematic diagram illustrating portions of a cable connected to a source and a sink in accordance with another embodiment of the present application.

In FIG. 4, a PTC device 26 is in series connected to the Vconn conductor 17 of the cable 10. The Vconn conductor 17 supplies power to the IC 24, e.g., 5V and 1 W. The IC 24 determines to output a high power or a low power on the power conductor 14 upon the devices to which the cable is connected. The high power usually is greater than 20 W, e.g., 100 W, whereas the low power usually is 5-10 W. As a temperature of the PTC device 26 exceeds the trip temperature, its resistance increases drastically to mitigate current flowing through the Vconn conductor 17. When the PTC device 26 is at a high resistance state, the Vconn conductor 17 no longer supplies power to the IC 24 and ceases transmission of data and/or power of the cable 10. In the environments of cable applications, 70° C. or 80° C. is a very high temperature. In an embodiment, the PTC device 26 has a trip temperature of 55-80° C. so as to timely and effectively provide over-temperature protection. Alternatively, the PTC device 26 may be implemented on the Vconn conductor 17 in the source 20 and/or the sink 21, or a plurality of PTC device are implemented on the Vconn conductor 17, thereby one or more PTC devices are in series connection to the Vconn conductor 17 to suppress current for over-temperature protection.

The cable 10 of the present application can be applied to standards other than USB Type C, such as USB Power Delivery, Apple Lightning Standard, Apple Thunderbolt Standard, various generations of Qualcomm Quick Charge standard, and earlier USB standards as well for over-temperature protection.

Figure 5:
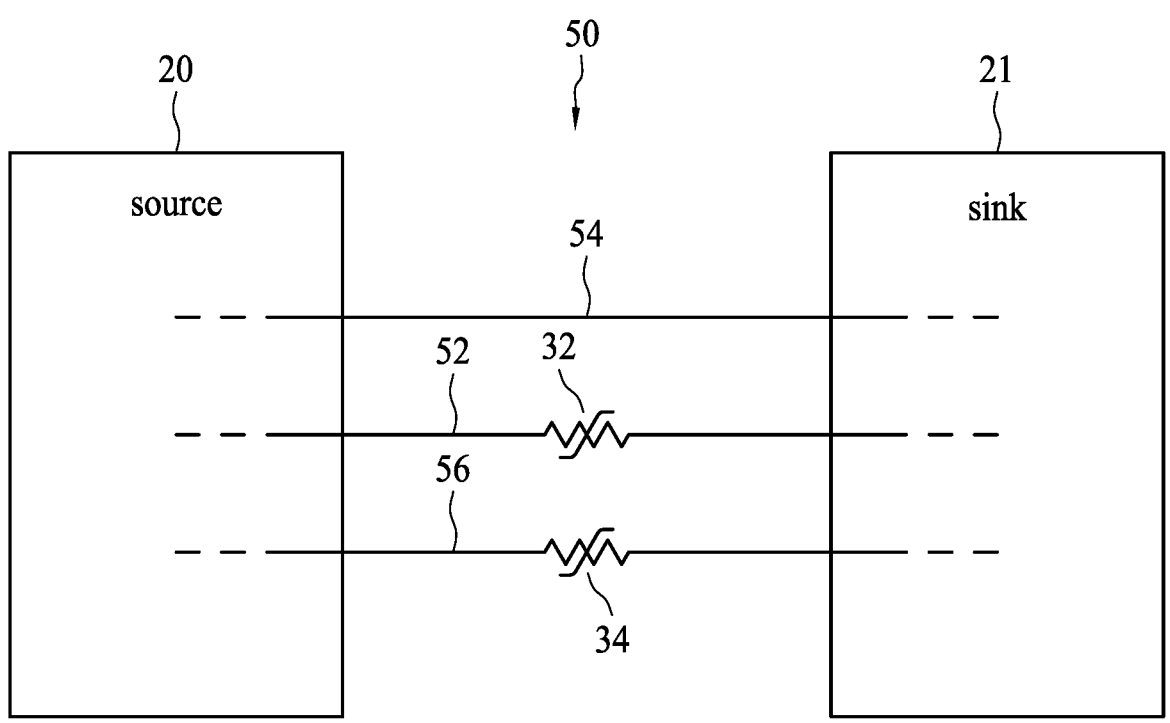
FIG. 5 shows a schematic diagram illustrating portions of a cable connected to a source and a sink in accordance with yet another embodiment of the present application.

FIG. 5 shows a cable 50 in compliance with Qualcomm Quick Charge standard 2.0 in accordance with an exemplary embodiment of the present application. The cable 50 comprises a D+ data conductor 52, a D− data conductor 56 and a power conductor 54. Ground conductors are irrelevant to the present application and thus are omitted in FIG. 5. The cable 50 connects to the source 20 and the sink 21 to transmit corresponding electrical powers from the source 20 to the sink 21 according to various voltages, e.g., 5V, 9V, 12V or 20V. If the D+ data conductor 52 and/or D− data conductor 56 appears "open" to the source 20, the source 20 will default to low power operation and provide 5V on the power conductor 54. The D+ data conductor 52 and the D− data conductor 56 are coupled with PTC devices 32 and 34 in series connection between the source 20 and the sink 21. If the PTC device 32 and/or the PTC device 34 heats up to exceed the trip temperatures caused by exposing the cable 50 in high temperature environments, the resistances of the PTC device 32 and/or the PTC device 34 will increase drastically to diminish current passing through the D+ data conductor 52 and/or the D− data conductor 56. As a result, the D+ data conductor 52 and/or the D− data conductor 56 appearing to the source 20 are "open" or disconnected, and therefore the cable 10 operates in a low power condition and the power conductor 54 only supplies 5V. This prevents the cable 10 from being damaged by overheat in high power operation. Alternatively, the PTC device 32 and/or the PTC device 34 may be implemented on the D+ data conductor 52 and/or the D− data conductor 56 in the source 20 and/or the sink 21, or a plurality of PTC device are implemented on the D+ data conductor 52 and/or the D− data conductor 56, thereby one or more PTC devices are in series with the D+ data conductor 52 and/or the D− data conductor 56 to suppress current for over-temperature protection.

The trip characteristic of the PTC device is crucial to provide over-temperature protection. The PTC device applied to cables usually needs a relatively low trip temperature and the resistance has to increase drastically within a certain period of time. In case of a relatively low resistance jump, the PTC device cannot effectively mitigate current at high temperature environments. The PTC devices may comprise but not limited to polymeric and/or ceramic PTC material as long as the materials are applicable and suitable for protecting cables. In particular, a polymeric PTC device compared to a ceramic PTC device has a relatively low resistance and more accurate trip temperature, and thus it is preferably employed in the present application. However, in view of material limitation, it is not easily attainable for a polymeric PTC device having low trip temperature and rapid resistance increase.

The following exemplary embodiments of the present application improve polymeric PTC material for cable applications. However, they are illustrative only and not limitations of the present application. Table 1 shows the composition and volumetric percentages (vol %) of the PTC material of the PTC devices which can be applied to cables. The PTC devices are of 0850 size (form factor) and a SMD structure as shown in U.S. Pat. No. 6,377,467. E1-E6 are the embodiments of the present application, and C1-C3 are comparative examples. The PTC material comprises polymer and conductive filler dispersed therein. The conductive filler uses carbon black (CB), titanium carbide (TiC) and/or tungsten carbide (WC). CB uses RAVEN 430 ULTRA of Columbian Chemical Company. TiC uses TI-301 of Atlantic Equipment Engineers (AEE) of a resistivity of 180-250 $\mu\Omega$·cm, and a particle size of 1-5 m. WC uses WP-301 of Micron Metals, Inc. of a resistivity of 80 $\mu\Omega$·cm and a particle size of 1-5 m. High density polyethylene (HDPE) uses TAISOX HDPE-8010 of Formosa Plastics, Inc. Low density polyethylene (LDPE-1) uses PL260 (RG) of Formosa Plastics, Inc. of a specific gravity of 0.91, a melting peak of 109° C. and a melting temperature range of 90-120° C. Another low density polyethylene (LDPE-2) uses DuPont EMA1209 of a specific gravity of 0.927, a melting peak of 101° C. and a melting temperature range of 50-110° C. LDPE-2 may use ionomer, ethylene ethyl acrylate (EEA) or ethylene butyl acrylate (EBA) copolymer of a large melting temperature range instead to reduce the trip temperature in the Resistance-Temperature (R-T) curve. The compositions of E1-E6 comprise low temperature material system (a mixture of LDPE-1 and LDPE-2) of a melting temperature range of 50-100° C., HDPE and conductive filler such as CB, TiC and WC, in which the low temperature material system LDPE-1 and LDPE-2 comprises 35-70%, e.g., 40%, 50% or 60%, by volume of the PTC material. C1-C3 are similar to E1-E6 in terms of composition, except C1-C3 only use LDPE-2 as the low temperature material system of less than 25% by volume and HDPE of greater than 40% by volume of the PTC material.

TABLE 1

| | LDPE-1 (vol %) | LDPE-2 (vol %) | HDPE (vol %) | CB (vol %) | TiC (vol %) | WC (vol %) |
|---|---|---|---|---|---|---|
| E1 | 32 | 16 | — | 7 | 45 | — |
| E2 | 46 | 16 | — | — | — | 38 |
| E3 | — | 44 | 12 | — | — | 44 |
| E4 | — | 38 | 7 | — | 55 | — |
| E5 | 46 | 10 | — | — | — | 44 |
| E6 | 50 | 15 | — | 35 | — | — |
| C1 | — | 22 | 46 | 32 | — | — |
| C2 | — | 16 | 41 | — | — | 43 |
| C3 | — | 11 | 42 | — | 47 | — |

R-T curves of the above embodiments and comparative examples are recorded. Initial resistances Ri, resistances after one trip R1-max, corresponding resistivities ρ, R-T trip temperatures, and resistances at 85° C. (R@85° C.) and 100° C. (R@100° C.) are listed in Table 2. It is known by those having ordinary skill in the art that the R-T trip temperature is the temperature at which resistance nonlinearly and rapidly increases, and it is equivalent to the trip temperature of the PTC device.

The conductive filler of E1 comprises TiC and CB, the R-T trip temperature is 70° C., the resistance at 85° C. is 27000 k$\Omega$, and the resistance at 100° C. is $10^5$ k$\Omega$. In E1, the resistance jumps at a relatively low temperature 70° C. and reaches to 27000 k$\Omega$) at 85° C., indicating that the resistance is able to increase drastically within a narrow temperature range to mitigate current. The conductive filler of E2 uses WC, the R-T trip temperature is 60° C., the resistance at 85° C. is 700 k$\Omega$, and the resistance at 100° C. is $10^5$ k$\Omega$. The rise of resistance at 85° C. of E2 is smaller than that of E1. The conductive filler of E3 uses WC, the R-T trip temperature is 60° C., the resistance at 85° C. is 240 k$\Omega$, and the resistance at 100° C. is 8400 k$\Omega$. E3 has a relatively low R-T trip temperature, and the rises of resistance at 85° C. and 100° C. are smaller in comparison with E1 and E2. The conductive filler of E4 uses TiC, the R-T trip temperature is 60° C., the resistance at 85° C. is 50 k$\Omega$, and the resistance at 100° C. is 158 k$\Omega$. The conductive filler of E5 uses WC, the R-T trip temperature is 75° C., the resistance at 85° C. is 700 k$\Omega$, and the resistance at 100° C. is $10^5$ k$\Omega$. The conductive filler of E6 uses CB, the R-T trip temperature is 75° C., the resistance at 85° C. is 22 k$\Omega$, and the resistance at 100° C. is 154 k$\Omega$. The conductive filler of C1 uses CB, the R-T trip temperature is 120° C., and therefore the temperatures at 85° C. and 100° C. have yet to reach the R-T trip temperature. The conductive filler of C2 uses WC, the R-T trip temperature is 110° C., and therefore 85° C. and 100° C. have yet to reach the R-T trip temperature. The conductive filler of C3 uses TiC, the R-T trip temperature is 110° C., and 85° C. and 100° C. have yet to reach the R-T trip temperature.

TABLE 2

|    | Ri (Ω) | R1-max (Ω) | Ri ρ(mΩ·cm) | R1-max ρ(mΩ·cm) | R-T Trip temp. (° C.) | R@85° C. | R@100° C. |
|----|--------|------------|-------------|-----------------|-----------------------|----------|-----------|
| E1 | 0.128  | 1.185      | 81.38       | 753.4           | 70                    | 27000 kΩ | $10^5$ kΩ |
| E2 | 0.0503 | 0.473      | 31.902      | 300.022         | 60                    | 700 kΩ   | $10^5$ kΩ |
| E3 | 0.0097 | 0.0907     | 6.185       | 57.851          | 60                    | 240 kΩ   | 8400 kΩ   |
| E4 | 0.0771 | 0.7395     | 48.83       | 468.4           | 60                    | 50 kΩ    | 158 kΩ    |
| E5 | 0.0141 | 0.126      | 8.952       | 80.621          | 75                    | 700 kΩ   | $10^5$ kΩ |
| E6 | 0.5042 | 2.6388     | 320         | 1675            | 75                    | 22 kΩ    | 154 kΩ    |
| C1 | 0.6168 | 6.0164     | 390.64      | 3810.4          | 120                   | 0.46Ω    | 0.59Ω     |
| C2 | 0.0097 | 0.0918     | 6.185       | 58.551          | 110                   | 0.22Ω    | 0.28Ω     |
| C3 | 0.0118 | 0.1101     | 7.487       | 69.862          | 110                   | 0.21Ω    | 0.22Ω     |

It is observed from E1-E6 that R-T trip temperature is lowered to 55-80° C. if the total of LDPE-1 and LDPE-2 comprises 35-70% by volume of the PTC material. However, C1-C3 of LDPE-2 less than 25% by volume have high R-T trip temperatures of 100-120° C., and therefore these comparative examples are unable to provide over-temperature protection required by cable applications. In an embodiment, the use of LDPE-2 make the PTC material has a large melting temperature range of 50-100° C. to lower R-T trip temperature. The conductive filler of mixture of CB of 5-10% by volume and TiC of 40-50% by volume performs superior resistance jump characteristic. In case of the use of CB as conductive filler, the PTC material preferably comprises CB of 25-45% by volume and the total of LDPE-1 and LDPE-2 of 55-75% by volume.

The USB Type C specification requires a CC conductor having a resistance less than 15Ω, and therefore a large resistance of the PTC device coupled to the CC conductor is not acceptable. For example, the resistance of 0402 size (form factor) PTC device has to be less than 10Ω, the resistance of 0603 size PTC device has to be less than 7Ω, and the resistance of 0805 size PTC device has to be less than 3.5Ω. The initial resistances Ri and resistances after one trip R1-max are very low and meet specification requirements. The resistivities ρ of the PTC devices of E1-E6 calculated upon Ri are smaller than 400 mΩ·cm, and are preferable less than 200 mΩ·cm. The resistivities ρ of E1-E6 calculated upon R1-max are smaller than 3000 mΩ·cm (3 Ω·cm), and are preferably equal to or less than 2.5 Ω·cm, 2 Ω·cm or 1 Ω·cm. The PTC device is usually soldered onto the cable such it will trip due to high temperature of soldering. Thus, the resistivities calculated upon R1-max are closer to the real conditions in cable applications.

The encapsulating insulating layer of the cable is usually unable to withstand high temperatures such as 100° C. Therefore, the PTC device has to exhibit a high resistance state at 100° C. to cease data and/or power transmission in the cable. At 60-80° C., the PTC device usually trips to lower the output of the cable. The PTC device of the present application has a trip temperature of 55-80° C., e.g., 60° C. or 70° C., a resistance larger than 20 kΩ or 36 kΩ at 85° C., and a resistance larger than 80 kΩ· or 96 kΩ at 100° C. The PTC device characterized in low temperature trip and high resistance jump satisfies the requirements of cable applications.

The PTC material of the above-mentioned PTC device comprises crystalline polymer and conductive filler dispersed therein. The crystalline polymer comprises polyethylene, polypropylene, polyvinyl fluoride, mixture or copolymer thereof. The conductive filler may comprise carbon-containing filler, metal filler, and/or ceramic filler. For example, the metal filler may be nickel, cobalt, copper, iron, tin, lead, silver, gold, platinum, or the alloy thereof. The ceramic filler may be titanium carbide (TiC), tungsten carbide (WC), vanadium carbide (VC), zirconium carbide (ZrC), niobium carbide (NbC), tantalum carbide (TaC), molybdenum carbide (MoC), hafnium carbide (HfC), titanium boride ($TiB_2$), vanadium boride ($VB_2$), zirconium boride ($ZrB_2$), niobium boride ($NbB_2$), molybdenum boride ($MoB_2$), hafnium boride ($HfB_2$), or zirconium nitride (ZrN). Moreover, the conductive filler may be the mixture, alloy, solid solution or core-shell of the aforesaid metal and ceramic fillers.

In the cable of the present application, a PTC device is coupled with the CC conductor as a temperature sensor. As a temperature exceeds the trip temperature of the PTC device, the CC conductor exhibits high resistance to cease data and/or power transmission of the cable. The PTC device performs low temperature trip and high resistance jump to timely and precisely provide over-temperature protection.

The above-described embodiments of the present invention are intended to be illustrative only. Numerous alternative embodiments may be devised by persons skilled in the art without departing from the scope of the following claims.

What is claimed is:

1. A cable, comprising:
   a power conductor configured to transmit electrical power between a source and a sink;
   a data conductor configured to transmit data between the source and the sink; and
   a first PTC device coupled to the data conductor and configured to diminish current flowing through the data conductor by drastic increase of a resistance of the first PTC device if a temperature of the first PTC device exceeds a first trip temperature;
   wherein the first trip temperature is 55-80° C., the first PTC device has a resistance larger than 20 kΩ at 85° C. and larger than 80 kΩ at 100° C., and current flowing through the data conductor is less than 20 mA;
   wherein the first PTC device comprises a PTC material of polymer and conductive filler dispersed in the polymer, and the conductive filler comprises carbon black of 5-10% by volume and titanium carbide of 40-50% by volume of the PTC material.

2. The cable of claim 1, wherein the first PTC device is in series with the source and the sink if the cable connects to the source and the sink.

3. The cable of claim 1, wherein the data conductor comprises a CC conductor, D+ data conductor or D− data conductor.

4. The cable of claim 1, further comprising a Vconn conductor and a second PTC device coupled to the Vconn conductor, and the second PTC device drastically increases in resistance to diminish current flowing through the Vconn conductor if a temperature of the second PTC device exceeds a second trip temperature.

5. The cable of claim 1, wherein the second PTC device is in series with a source and a sink if the cable connects to the source and the sink.

6. The cable of claim 1, wherein the cable is in compliance with USB Type C standard.

7. The cable of claim 1, wherein the first PTC device has a resistivity less than 3 Ω·cm.

8. The cable of claim 1, wherein the polymer comprises low density polyethylene of which a melting temperature range is 50-100° C.

9. The cable of claim 8, wherein the low density polyethylene comprises 35-70% by volume of the PTC material.

10. The cable of claim 1, wherein the conductive filler further comprises tungsten carbide.

11. A cable, comprising:
a power conductor configured to transmit electrical power between a source and a sink;
a data conductor configured to transmit data between the source and the sink; and
a first PTC device coupled to the data conductor and configured to diminish current flowing through the data conductor by drastic increase of a resistance of the first PTC device if a temperature of the first PTC device exceeds a first trip temperature;
wherein the first trip temperature is 55-80° C., the first PTC device has a resistance larger than 20 kΩ at 85° C. and larger than 80 kΩ at 100° C., and current flowing through the data conductor is less than 20 mA;
wherein the first PTC device comprises a PTC material of polymer and conductive filler dispersed in the polymer, the polymer comprises low density polyethylene of which a melting temperature range is 50-100° C., the low density polyethylene comprises 35-70% by volume of the PTC material, and the conductive filler comprises tungsten carbide of 35-50% by volume of the PTC material.

12. A cable, comprising:
a power conductor configured to transmit electrical power between a source and a sink;
a data conductor configured to transmit data between the source and the sink; and
a first PTC device coupled to the data conductor and configured to diminish current flowing through the data conductor by drastic increase of a resistance of the first PTC device if a temperature of the first PTC device exceeds a first trip temperature;
wherein the first trip temperature is 55-80° C., the first PTC device has a resistance larger than 20 kΩ at 85° C. and larger than 80 kΩ at 100° C., and current flowing through the data conductor is less than 20 mA;
wherein the first PTC device comprises a PTC material of polymer and conductive filler dispersed in the polymer, the polymer comprises low density polyethylene of which a melting temperature range is 50-100° C., the low density polyethylene comprises 35-70% by volume of the PTC material, and the conductive filler comprises titanium carbide of 50-60% by volume of the PTC material.

* * * * *